G. G. Hickman,
Inkstand.
No. 86,670. Patented Feb. 9. 1869.
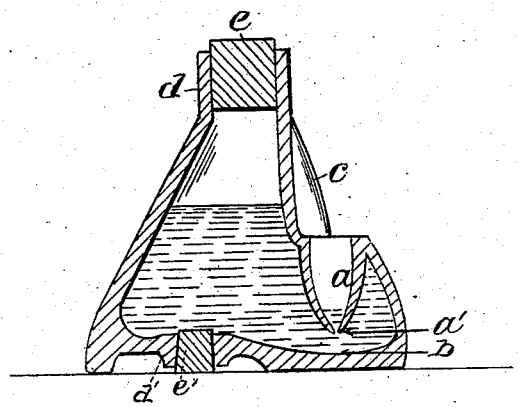
Witnesses
W. B. Denning
Wm. H. Brereton
G. G. Hickman.
By Knight & Bro
attys.

UNITED STATES PATENT OFFICE.

GIBBONS G. HICKMAN, OF COATESVILLE, PENNSYLVANIA.

Letters Patent No. 86,670, dated February 9, 1869.

IMPROVEMENT IN INKSTANDS.

The Schedule referred to in these Letters Patent and making part of the same.

*To all whom it may concern:*

Be it known that I, GIBBONS G. HICKMAN, of Coatesville, in the county of Chester, and State of Pennsylvania, have invented a new and useful Improvement in Bottles; and I do hereby declare the following to be a full, clear, and exact description thereof, reference being had to the accompanying drawing, which is made a part of this specification, and which represents a vertical section of an ink-bottle illustrating my invention.

My improved bottle is preferably made of glass, in the usual way, and is provided with a cup-shaped tube, $a$, formed in one piece with its top or side, and projecting downward therefrom, either vertically or obliquely, and provided at its lower extremity with a contracted aperture, $a'$, in either its end or side, through which it is kept supplied with a small quantity of the fluid contained in the bottle.

A well or depression, $b$, is formed in the bottom, directly beneath this tube, so as to avoid the necessity of keeping a large quantity of fluid in the bottle to cause it to operate; and also (in connection with the downwardly projecting tube $a$) to prevent any of the contained liquid being ejected through the dipping-aperture by sudden motions of the bottle.

The upper opening of the tube $a$ may be in the bottom of a dent or depression, $c$, to facilitate the introduction of an instrument, such as a wire or pen, into the tube, to take out the requisite supply of the fluid for use.

Necks $d\ d'$ are provided for the introduction of the fluid, and closed by the customary stoppers $e\ e'$. One only, however, is requisite, and either one of them may be used.

This bottle operates on the well-known principle of the "bird-fountain," and, in that respect, similarly to the bottle for which Letters Patent were granted to me March 3, 1868.

It may be employed for any purpose for which it is adapted, and its form be varied to suit the taste or to better adapt it for any particular use.

I am aware that "bird-fountain" inkstands have before been made with a well beneath the dipping-aperture, as seen, for example, in the patent of S. Walker, dated January 6, 1863, but my downwardly-projecting tube $a$ operates in connection with the well or depression $b$ in a new and useful manner, to prevent any of the contained liquid being thrown upward with sufficient momentum to endanger its escape through the dipping-aperture.

I claim as new, and desire to secure by Letters Patent—

The tube $a$, formed in one piece with the side or top of the bottle, and extending either vertically or obliquely downward, with an opening in its bottom or side, when employed separately from the stopper-aperture, through which the bottle is filled, and in combination with the well or depression $b$ in the bottom of the bottle, under the said tube $a$.

To the above specification of my said invention I have signed my hand, this 4th day of June, 1868.

G. G. HICKMAN.

Witnesses:
 WM. H. BRERETON,
 J. E. M. BOWEN.